United States Patent
Liu et al.

(10) Patent No.: US 8,982,238 B2
(45) Date of Patent: Mar. 17, 2015

(54) MULTI-TARGET AUTOMATIC EXPOSURE AND GAIN CONTROL BASED ON PIXEL INTENSITY DISTRIBUTION

(71) Applicant: OmniVision Technologies, Inc., Santa Clara, CA (US)

(72) Inventors: Chengming Liu, San Jose, CA (US); Jizhang Shan, Cupertino, CA (US); Donghui Wu, Sunnyvale, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 140 days.

(21) Appl. No.: 13/933,674

(22) Filed: Jul. 2, 2013

(65) Prior Publication Data

US 2015/0009361 A1 Jan. 8, 2015

(51) Int. Cl.
*H04N 5/235* (2006.01)
*H04N 5/217* (2011.01)
*H04N 5/228* (2006.01)

(52) U.S. Cl.
CPC .................................. *H04N 5/2352* (2013.01)
USPC ...................... 348/229.1; 348/241; 348/222.1

(58) Field of Classification Search
CPC ...... H04N 5/21–5/2178; H04N 3/155–3/1568; H04N 5/2351
USPC ......... 348/241, 221.1, 222.1, 229.1, 294–324
See application file for complete search history.

(56) References Cited

U.S. PATENT DOCUMENTS

| | | | |
|---|---|---|---|
| 7,925,152 B2 | 4/2011 | Lien et al. | |
| 8,031,237 B2 | 10/2011 | Kirisawa | |
| 8,149,326 B2 | 4/2012 | Olsen et al. | |
| 8,165,416 B2 | 4/2012 | Cutler | |
| 8,264,594 B2 | 9/2012 | Yeo et al. | |
| 8,334,924 B2 | 12/2012 | Yeo et al. | |
| 8,760,538 B2* | 6/2014 | Ross | 348/229.1 |
| 2007/0070216 A1* | 3/2007 | Yabe | 348/229.1 |
| 2009/0141978 A1* | 6/2009 | Roffet et al. | 382/167 |
| 2012/0050566 A1* | 3/2012 | Cote et al. | 348/224.1 |
| 2012/0188414 A1* | 7/2012 | Ross | 348/241 |
| 2012/0268632 A1 | 10/2012 | Kamon et al. | |
| 2012/0307107 A1 | 12/2012 | Brunner | |
| 2013/0201401 A1* | 8/2013 | Hirooka et al. | 348/607 |
| 2013/0208138 A1* | 8/2013 | Li et al. | 348/229.1 |

* cited by examiner

*Primary Examiner* — Pritham Prabhakher
(74) *Attorney, Agent, or Firm* — Blakely Sokoloff Taylor & Zafman LLP

(57) ABSTRACT

An example method of multi-target automatic exposure and gain control based on pixel intensity distribution includes capturing a series of digital images with an image sensor. As the series of digital images are captured, exposure time and/or gain are adjusted to adjust a mean intensity value of the digital images until a target mean intensity value is reached. The method includes dynamically selecting the target mean intensity value from a plurality of target mean intensity values based on a relative number of pixels, in each captured digital image, that have an intensity value that falls outside a range of intensity values.

19 Claims, 5 Drawing Sheets

MULTI-TARGET AUTOMATIC EXPOSURE AND GAIN CONTROL BASED ON PIXEL INTENSITY DISTRIBUTION

TECHNICAL FIELD

This disclosure relates generally to image sensors, and in particular but not exclusively, relates to automatic exposure and gain control for image sensors.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, as digital imaging becomes more prevalent, technology strives to achieve images and video having better resolution and color accuracy.

Conventional CMOS image sensors typically include an array of pixels, where each pixel includes a photodiode that transforms incident light into an electrical charge. Each individual pixel has an output that, for a fixed exposure time, eventually saturates with increasing light intensity. Saturation of the photodiodes can produce unwanted image smearing due to an effect known as blooming, where excess charge spreads into neighboring pixels. Thus, one aim of the image sensor is to achieve images in which objects are exposed properly, i.e., not too bright or too dark. Conventional image sensors often provide images whose exposures are not optimized. Some conventional image sensors may apply post image-acquisition algorithms to allow the digital image data to be further processed to achieve a particular color and intensity associated with a specific pixel. However, the more post image-acquisition corrections that are applied to an image, the more the overall quality of an image may degrade. A similar phenomenon is known to film photographers, who recognize that a better print may be made from a good negative than a print that is made after applying multiple, albeit advanced, manipulations to a mediocre negative.

In some conventional methods of automatic exposure control, a mean intensity of a single window of the whole or part of image is determined. The intensity may be luminance Y signal or one or more color channel signals. A predefined target mean intensity (i.e., a desired fixed mean intensity) is then assigned and the difference between the mean intensity and the target mean intensity is determined. Exposure correction is determined based upon this difference. However, using a single predefined target mean intensity may still result in too many bright and/or too many dark pixels present in the image, which can make the image uncomfortable to view. Furthermore, the application of a single window of part of image when calculating the mean intensity often results in less accurate target intensity estimation, since different parts of the image may have different intensity distributions.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of Multi-Target Automatic Exposure and Gain Control Based on Pixel Intensity Distribution are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
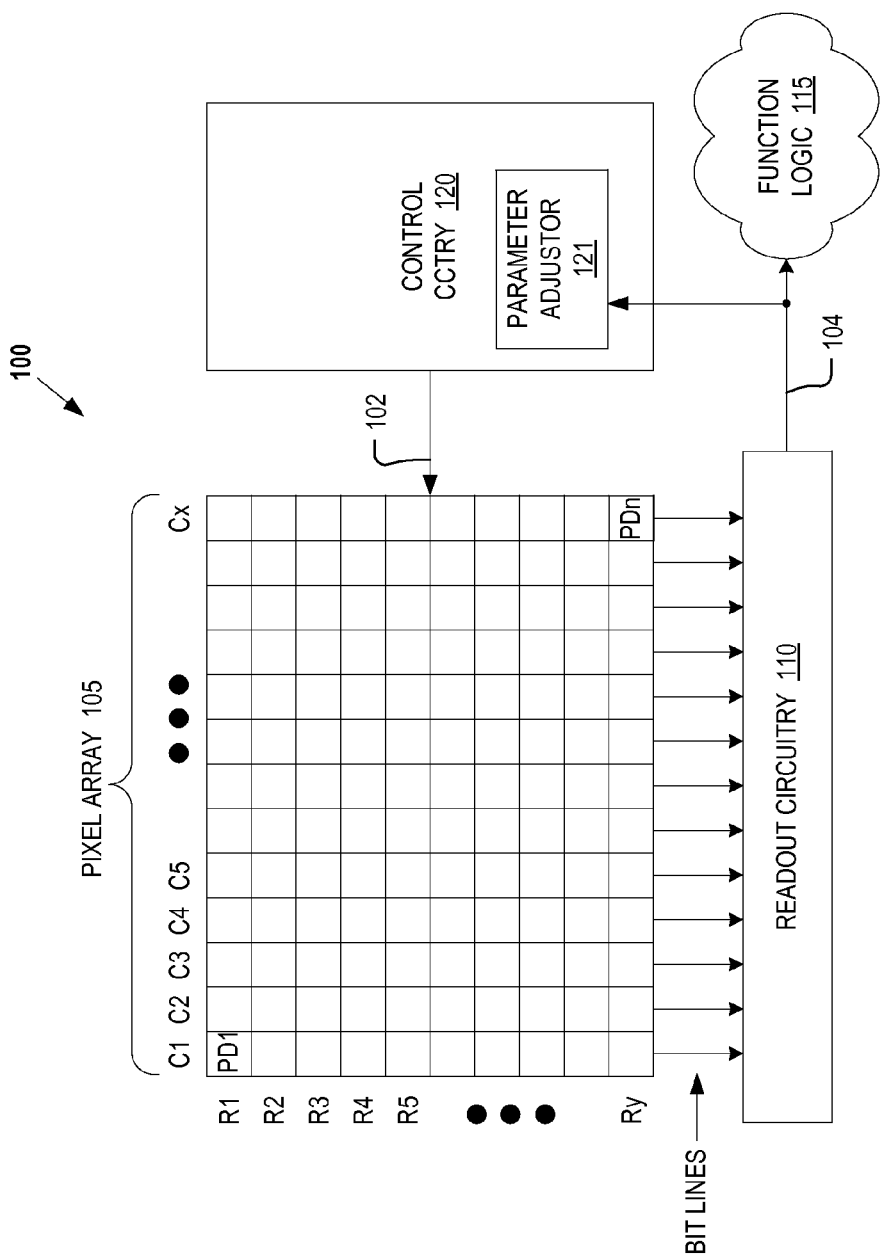
FIG. 1 is a block diagram illustrating an image sensor, in accordance with an embodiment of the present disclosure.

FIG. 1 is a block diagram illustrating an image sensor 100, in accordance with an embodiment of the present disclosure. The illustrated embodiment of image sensor 100 includes an active area (i.e., pixel array 105), readout circuitry 110, function logic 115, and control circuitry 120.

Pixel array 105 may be a two-dimensional array of backside or frontside illuminated imaging pixels (e.g., pixels PD1, . . . , Pn). In one embodiment, each pixel is an active pixel sensor ("APS"), such as a complementary metal-oxide-semiconductor ("CMOS") imaging pixel. As illustrated, each pixel is arranged into a row (e.g., rows R1 to Ry) and a column (e.g., column C1 to Cx) to acquire image data of a person, place, or object, which can then be used to render an image of the person, place, or object.

After each pixel has acquired its image data or image charge, the image data 104 is read out by readout circuitry 110 and transferred to function logic 115. Readout circuitry 110 may include amplification circuitry, analog-to-digital conversion circuitry, or otherwise. Function logic 115 may simply store the image data 104 or even manipulate the image data by applying post image effects (e.g., crop, rotate, remove red eye, adjust brightness, adjust contrast, or otherwise). In one embodiment, readout circuitry 110 may read out a row of image data at a time along readout bit lines (illustrated) or may readout the image data using a variety of other techniques (not illustrated), such as a serial readout or a full parallel readout of all pixels simultaneously.

Control circuitry 120 is coupled to pixel array 105 to control operational characteristics of pixel array 105. For example, control circuitry 120 may include a parameter adjustor 121 for adjusting the exposure and/or gain of pixel array 105 in response to the acquired image data 104. As will be discussed in more detail below, parameter adjustor 121 may adjust the exposure and/or gain of pixel array 105 by way of control signal(s) 102 as a series of digital images are acquired by pixel array 105 in order to adjust a mean intensity value of each digital image until a target mean intensity value is reached. Parameter adjustor 121 may also dynamically select the target mean intensity value from several possible target mean intensity values based on the relative number of pixels, in each captured digital image, that have an intensity value that falls outside a range of intensity values. In one embodiment, the range of intensity values includes pixels whose intensity values are determined to be neither too bright, nor too dark. Thus, instead of using a single fixed target mean intensity value, as is done in some conventional applications, embodiments of the present invention use multiple target mean intensity values to avoid the accumulation of too many bright and/or too many dark pixels in the image. Accordingly, in some embodiments, after the automatic exposure/gain control is completed, a subsequent image(s) will have predefined percentages of saturated and/or dark pixels.

Control circuitry 120 includes parameter adjustor 121 for performing any of the processes described herein. Although FIG. 1 illustrated parameter adjustor 121 as included in control circuitry 120, other embodiments may include parameter adjustor disposed elsewhere within image sensor 100, or even separate and off-chip from image sensor 100. Parameter adjustor 121 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with image sensor 100, and is not to be limited to any particular type of memory or number of memories, or type of media upon which memory is stored.

Figure 2:
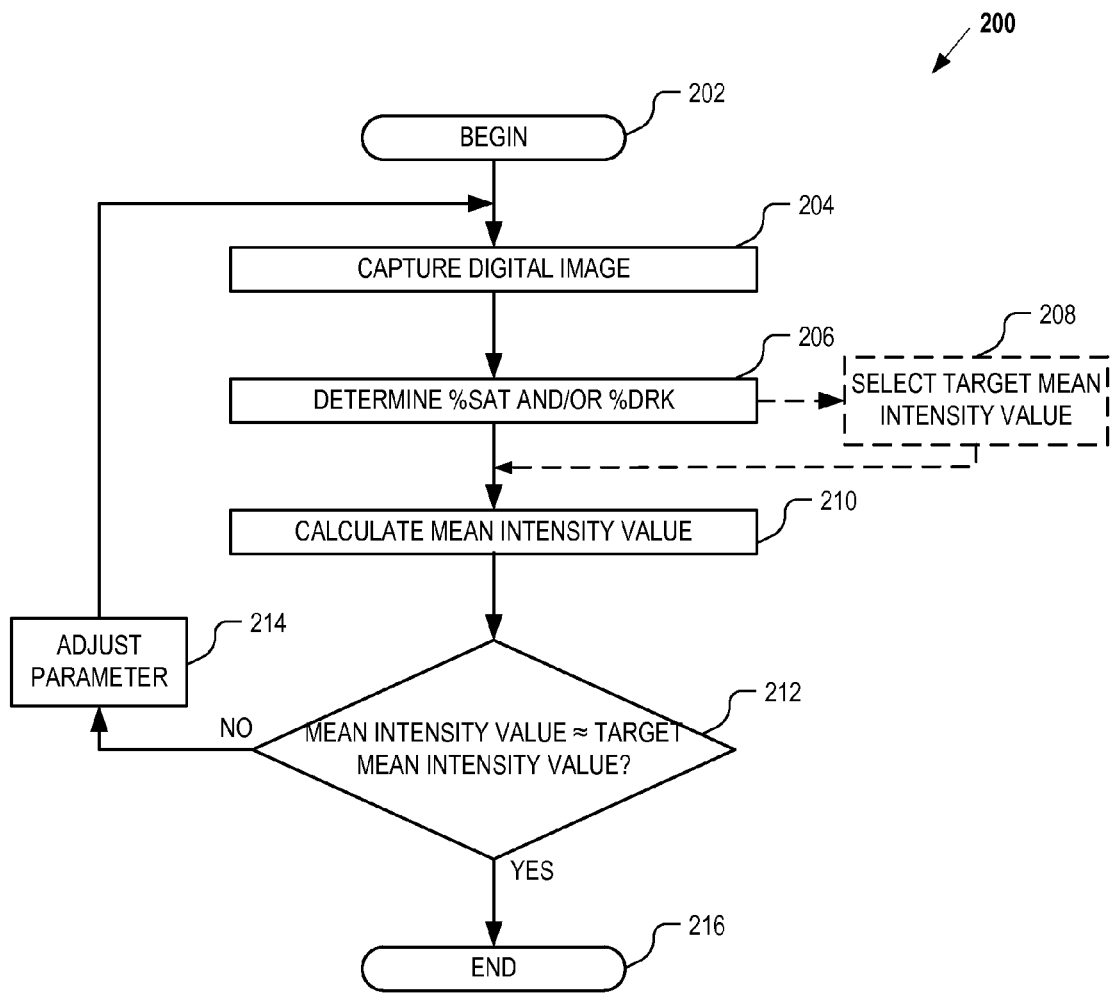
FIG. 2 a flowchart illustrating a process of multi-target automatic exposure and gain control, in accordance with an embodiment of the present disclosure.

FIG. 2 a flowchart illustrating a process 200 of multi-target automatic exposure and gain control, in accordance with an embodiment of the present disclosure. Process 200 begins at block 202 and immediately proceeds to process block 204 where a first digital image is captured (e.g., acquired by pixel array 105 of FIG. 1). Next, in process block 206, a relative number of pixels in the captured image that have an intensity value that falls outside a range of intensity values is determined. As shown in FIG. 2, this may include determining a percentage of saturated pixels (i.e., % SAT) and/or a percentage of dark pixels (i.e., % DRK) included in the captured image.

Figure 3:
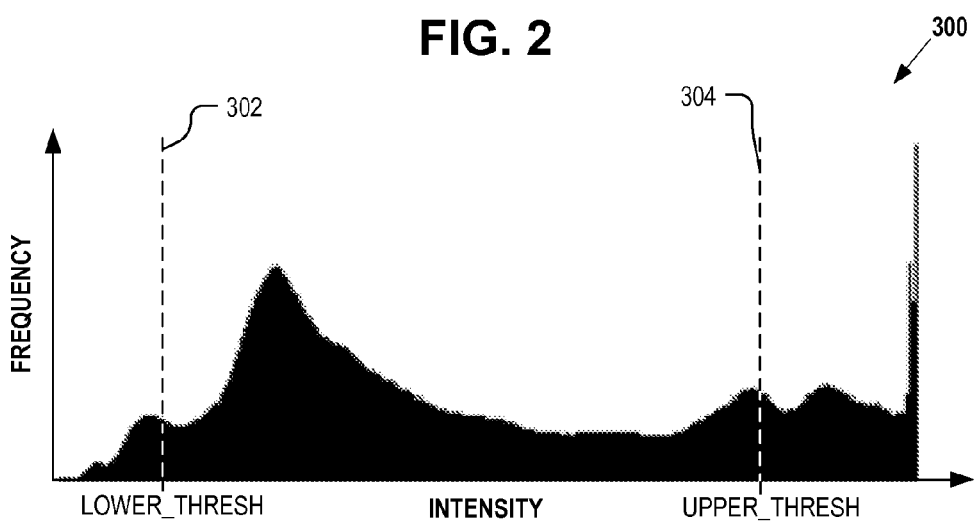
FIG. 3 is a histogram illustrating a pixel intensity distribution of a digital image.

By way of example, FIG. 3 is a histogram 300 illustrating a pixel intensity distribution of an example captured digital image. As shown in FIG. 3, pixels that have an intensity value in the range between lower threshold 302 and upper threshold 304 may be considered as pixels having a "normal" or "acceptable" intensity value. Pixels that have an intensity value that falls outside of this range may be deemed as either too dark or as too bright. That is, pixels whose intensity value is less than lower threshold 302 may be deemed as dark pixels, whereas pixels that have an intensity value greater than upper threshold 304 may be deemed as saturated pixels.

Accordingly, process block 206, in determining the percentage of saturated pixels, may simply calculate the percentage of pixels included in the captured image that have an intensity value greater than upper threshold 304. Similarly, determining the percentage of dark pixels may include calculating the percentage of pixels included in the captured image that have an intensity value less than lower threshold 302.

In one embodiment, the intensity value of each pixel is the luminance Y value of the respective pixel. In another embodiment, the intensity value of each pixel is the largest of the red (R) value, the green (G) value, and the blue (B) value of the respective pixel. In yet another embodiment, the intensity value may be any of the color values implemented by the pixel array (e.g., red (R), blue (B), cyan (C), magenta (M), or yellow (Y)).

Referring now back to FIG. 2, process 200 then proceeds to process block 208, which may, in some iterations of process 200, select a target mean intensity value based on the results of process block 206. In one embodiment, the target mean intensity value is selected from several possible target mean intensity values. For example, embodiments of the present disclosure may include a low target mean intensity value for images having a relatively large number of saturated pixels, a high target mean intensity value for images having a relatively large number of dark pixels, and a mid-target mean intensity value for images having neither too many saturated pixels nor too many dark pixels. In addition, embodiments disclosed herein may provide for additional target mean intensity values that are between the low and mid-target mean values and also between the mid and high target mean values. Details of selecting a target mean intensity value will be described in more detail below with reference to FIGS. 6 and 7.

Figure 4:
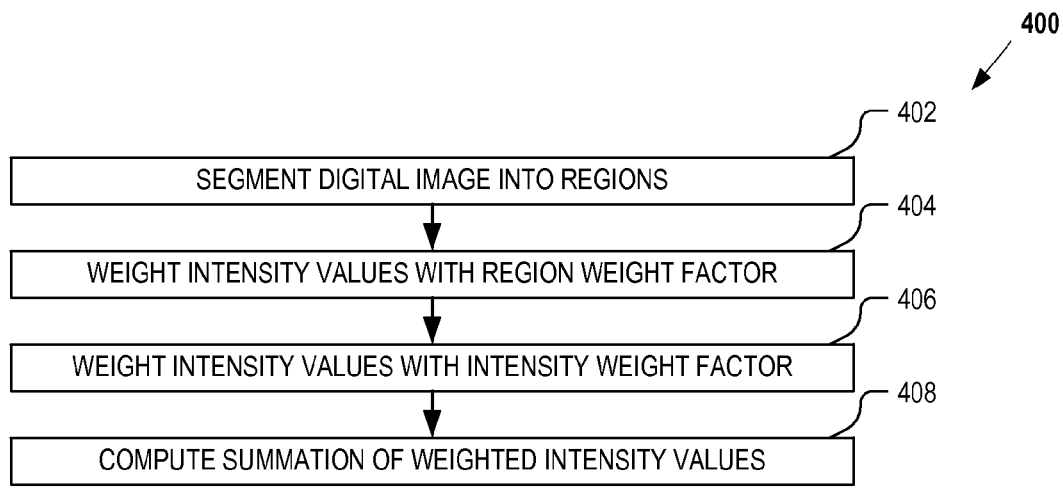
FIG. 4 is a flowchart illustrating a process of calculating a mean intensity value of pixels included in a digital image, in accordance with an embodiment of the present disclosure.

Next, in process block 210, a mean intensity value of the captured image is calculated. In one embodiment, calculating the mean simply includes calculating the average the intensity values of the pixels included in the image. However, embodiments of the present disclosure may provide for a more accurate calculation of the mean intensity value by applying one or more weighting factors to each pixel's intensity value. FIG. 4 is a flowchart illustrating an example process 400 of calculating the mean intensity value of pixels included in a digital image in accordance with an embodiment of the present disclosure. Process 400 is one possible implementation of process block 210 of FIG. 2.

Figure 5:
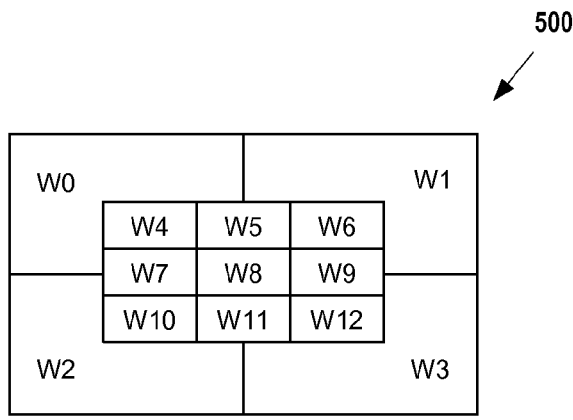
FIG. 5 is a diagram illustrating an image segmented into several regions, with each region having an associated region weight factor, in accordance with an embodiment of the present disclosure.

In process block 402, the digital image is segmented into several distinct regions. For example, FIG. 5 is a diagram illustrating an image that has been segmented into several regions (e.g., regions 0-12). Although FIG. 5 illustrates an image segmented into thirteen (13) regions, embodiments of the present disclosure may include segmenting the image into any number of regions including two or more. As shown in FIG. 5, each region has an associated region weight factor (e.g., W0-W12). In one embodiment, the region weight factor for regions located near the center of the image (e.g., region weight factor W8) may be greater than the region weight factors for regions located near the periphery of the image (e.g., W0).

Next, in process block 404 of process 400, the intensity value ($Y_i$) of each pixel is weighted a first time with the region weight factor ($W_i$) that is associated with the region where a respective pixel is located. For example, the intensity values for pixels located at or near the center of the image will be weighted with region weight factor W8, while intensity values for pixels located at or near the upper-left corner will be weighted with region weight factor W0.

In process block 406, the intensity values of each pixel are now weighted a second time, this time with an intensity weight factor (Mi) that is selected based on the original (i.e., unweighted) intensity value (Yi) of the respective pixel. For example, the intensity value of each pixel may be placed into one of three intensity brackets, where different intensity weight factors are assigned to different intensity brackets. In one embodiment, the intensity weight factor (Mi) for the intensity value (Yi) of a pixel i of the image, is determined as follows:

$$Mi = \begin{cases} M0, \text{ if } Yi < \text{LOW\_THRESH} \\ M1, \text{ if } \text{LOW\_THRESH} \le Yi \le \text{UPPER\_THRESH} \\ M2, \text{ if } Yi > \text{UPPER\_THRESH} \end{cases} \quad \text{EQ. 1}$$

In one embodiment, the intensity weight factors M0 (intensity weight factor for dark pixels) and M2 (intensity weight factor for saturated pixels) are larger than the intensity weight factor M1 (intensity weight factor for normal brightness pixels). In other words, the intensity weight factor is greater for pixels whose intensity value falls outside the range of "normal" or "acceptable" intensity values as defined by the lower threshold 302 and upper threshold 304 of FIG. 3, than the intensity weight factor for pixels whose intensity value falls within the range.

Next, process 400 proceeds to process block 408, where the summation of the weighted intensity values is calculated. In one embodiment, process 400 of calculating the mean intensity value may be represented by the following equation:

$$\text{Mean Intensity Value} = \frac{\sum (Wi * Mi * Yi)}{\sum (Wi * Mi)} \quad \text{EQ. 2}$$

Referring now back to FIG. 2, after the mean intensity value is calculated in process block 210, process 200 proceeds to decision block 212 where the calculated mean intensity value is compared against the target mean intensity value. If the calculated mean intensity value is not equal to the target mean intensity value then process 200 advances to process block 214. In process block 214 a parameter of the image sensor is adjusted to adjust the mean intensity value of the next acquired image. In one example, the parameter to be adjusted is the exposure time of the image sensor (e.g., amount of time photoelectrons are allowed to accumulate in photodiode). In another embodiment, the parameter to be adjusted is the gain applied to each pixel of the image sensor. In yet another embodiment, both the exposure time and gain are the adjusted parameters. In this embodiment, the gain may only be increased once the exposure time has reached a maximum value. Similarly, in one example, the exposure time may be only decreased once the gain has been first reduced to unity (i.e., 1.0).

With the parameter of the image sensor adjusted in process block 214, process 200 then returns to process block 204 to capture another digital image. If, in decision block 212, the calculated mean intensity value equals the target mean intensity value, then the auto exposure/gain control of process 200 is complete at block 216. Accordingly, the automatic exposure/gain control of process 200 includes capturing a series of digital images and adjusting the exposure and/or gain as the images are captured until a target mean intensity value is reached. As the digital images are captured a target mean intensity value is dynamically selected based on the percentage of saturated and/or dark pixels included in each captured image.

For example, the target mean intensity value may be set to a low target mean intensity value while the percentage of saturated pixels is greater than a first threshold percentage amount. Similarly, the target mean intensity value may be set to a high target mean intensity value while the percentage of dark pixels is greater than a second threshold percentage amount. If both the percentage of saturated pixels is less than the first percentage amount and the percentage of dark pixels is less than the second threshold percentage amount, then the target mean intensity value may be set to a mid-target mean intensity value, where:

LOW TARGET<MID-TARGET<HIGH TARGET        EQ.3

Figure 6:
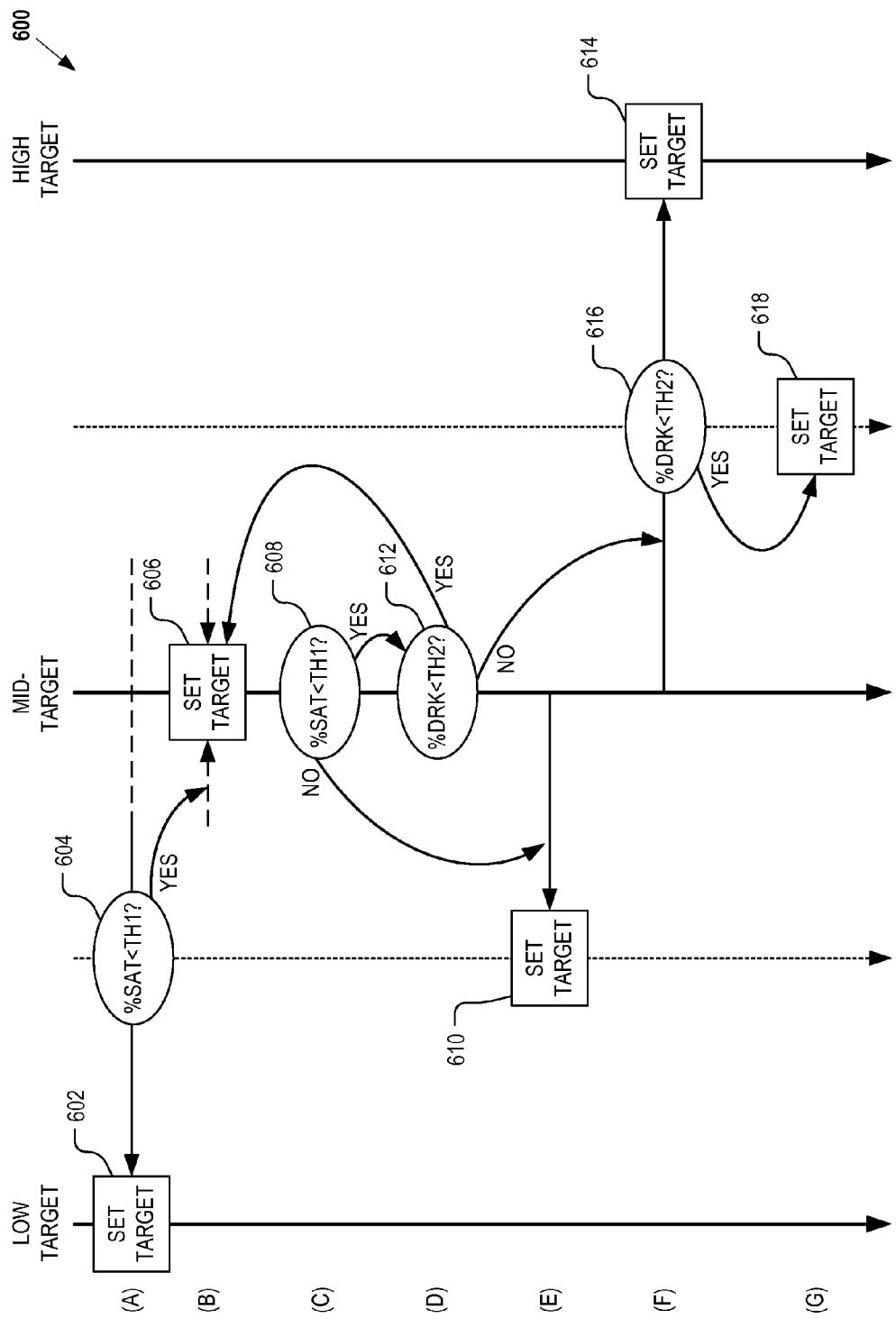
FIG. 6 is a chart illustrating the selection of a target mean intensity value, in accordance with an embodiment of the present disclosure.

FIG. 6 is a chart 600 illustrating the selection of a target mean intensity value, in accordance with an embodiment of the present disclosure. Chart 600 illustrates several actions (e.g., actions (A)-(G)) that may be undertaken by an image sensor (e.g., image sensor 100) to select a target mean intensity value while the digital images are captured for the purpose of automatic exposure/gain control. Action (A) illustrates the decreasing of a parameter (e.g., exposure and/or gain) while the percentage of saturated pixels in each captured image exceeds a first threshold percentage amount (TH1) in order to reduce the calculated mean intensity value as the images are acquired. If, while reducing the parameter of the image sensor, the calculated mean intensity value is reduced to be equal to or less than the low target mean intensity value, then the target mean intensity value is set to the low target mean intensity value in block 602 and the automatic gain/exposure control is complete. If, however, while reducing the parameter in action (A), the percentage of saturated pixels drops below the first threshold percentage amount (e.g., see decision 604), then the image sensor proceeds to action (B) where the parameter is then adjusted such that the mean intensity value is approximately equal to the mid-target mean intensity value. If while at the mid-target mean intensity value, both the percentage of saturated pixels is less than the first threshold amount (TH1) and the percentage of dark pixels is less than the second threshold amount (TH2) then block 606 sets the target mean intensity value to the mid-target mean intensity value and the automatic gain/exposure control is complete.

In action (C), if the percentage of saturated pixels is greater than the first threshold percentage amount (TH1) while the mean intensity value is at the mid-target mean intensity value, the image sensor then proceeds to action (e), where the parameter of the image sensor is decreased until the percentage of saturated pixels is less than the first threshold percentage amount, such that the mean intensity value is between the low target mean intensity value and the mid-target mean intensity value. In block 610, the target mean intensity value is set to a value between the low and mid-target mean intensity values and the automatic gain/exposure control is complete.

In action (D), if the percentage of saturated pixels is less than the first threshold percentage amount but the percentage of dark pixels is greater than the second threshold percentage amount (TH2) while the mean intensity value is at the mid-target mean intensity value, the image sensor then proceeds to action (F), where the parameter is increased until the percentage of dark pixels drops below the second threshold percentage amount (TH2). If in decision block 616 it is determined that the percentage of dark pixels has indeed dropped below the second threshold percentage amount the target mean intensity value is set in block 618, such that the mean intensity value is between the mid-target mean intensity value and the high target mean intensity value and the automatic gain/exposure control is complete.

If, while increasing the parameter in action (F), the mean intensity value increases to greater than or equal to the high target mean intensity value, the image sensor stops increasing the parameter, the target mean intensity value is set to the high target mean intensity value in block 614, and the automatic gain/exposure control completes.

Figure 7:
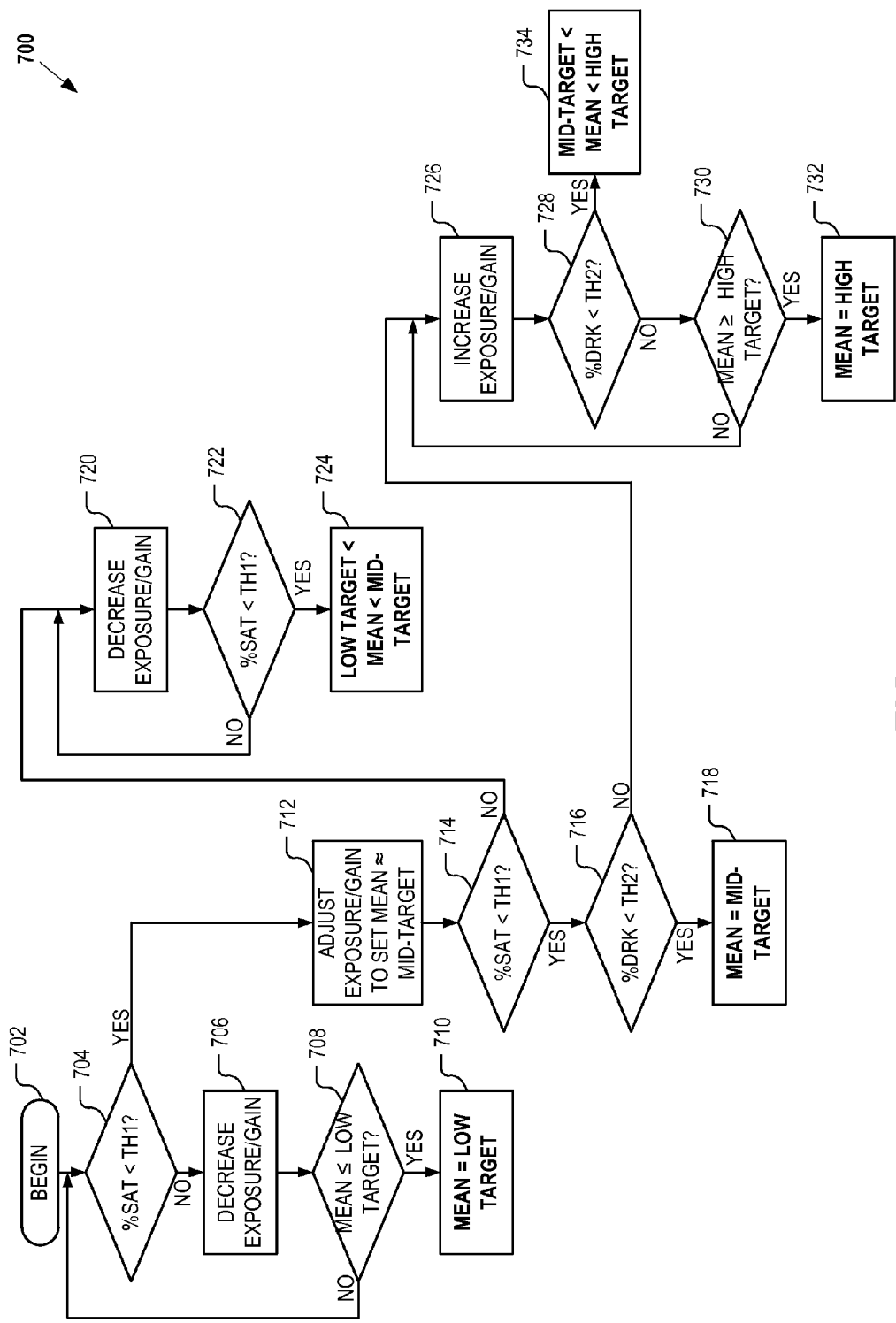
FIG. 7 is a flowchart illustrating the selection of a target mean intensity value, in accordance with an embodiment of the present disclosure.

FIG. 7 is a flowchart illustrating a process 700 of selecting a target mean intensity value, in accordance with an embodiment of the present disclosure. Process 700 is similar to the actions illustrated in chart 600 of FIG. 6, and illustrates a process that may be undertaken by an image sensor (e.g., image sensor 100) to select a target mean intensity value while the digital images are captured for the purpose of automatic exposure/gain control.

Process 700 begins in block 702 where the capturing and analysis of digital images begins. In decision block 704, the percentage of saturated pixels (% SAT) is compared with the first threshold percentage amount (TH1). If the percentage of saturated pixels exceeds the first threshold percentage amount the process 700 proceeds to process block 706 where the exposure and/or gain of the image sensor are decreased. In decision block 708, the calculated mean intensity value of the next captured image is then compared against the low target mean intensity value. If the calculated mean intensity value is less than or equal to the low target mean intensity value then process 700 ends in process block 710, where the parameter of the image sensor is set such that the mean intensity value is approximately equal to the low target mean intensity value. If, in decision block 708, the calculated mean intensity value had not yet reached the low target mean intensity value, then process 700 returns to decision block 704 to again compare the percentage of saturated pixels with the first threshold percentage amount (TH1). If, due to the decreasing of the parameter in block 706, the percentage of saturated pixels drops below the first threshold percentage amount, then process 700 proceeds to process block 712, where the exposure and/or gain are adjusted in order to set the mean intensity value to the mid-target mean intensity value. The adjustment of the exposure and/or gain in block 712 may include increasing the exposure and/or gain or it may include decreasing the exposure and/or gain depending on whether the mean intensity value in decision block 704 was greater than or less than the mid-target mean intensity value.

Next, in decision block 714, with the mean intensity value set to the mid-target mean intensity value, the percentage of saturated pixels is again compared with the first threshold percentage amount. If the percentage of saturated pixels is still less than the first threshold percentage amount then decision block 716 compares the percentage of dark pixels (% DRK) with the second threshold percentage amount (TH2). If both the percentage of saturated pixels and dark pixels are less than their respective threshold percentage amounts, process 700 ends in process block 718, where the parameter of the image sensor is set such that the mean intensity value is approximately equal to the mid-target mean intensity value.

If, in decision block 714, it is determined that setting the mean intensity value to the mid-target mean intensity value resulted in the percentage of saturated pixels rising above the first threshold percentage amount, process block 720 and decision block 722 reduce the exposure and/or gain until the percentage of saturated pixels drops below the first threshold percentage amount. When the percentage of saturated pixels drops below the threshold percentage amount in decision block 722, process 700 then ends in process block 724, where the parameter of the image sensor is set such that the mean intensity value is between the low target mean intensity value and the mid-target mean intensity value.

Returning now back to decision block 716, if, while the mean intensity value is at the mid-target mean intensity value and the percentage of dark pixels exceeds the second threshold percentage amount, process 700 then proceeds to process block 726 to begin increasing the exposure and/or gain. Process block 726, decision block 728, and decision block 730, include increasing the exposure and/or gain of the image sensor until either the percentage of dark pixels drops below the second threshold percentage amount (i.e., decision block 728) or until the calculated mean intensity value is greater than or equal to the high target mean intensity value (i.e., decision block 730).

If, while increasing the exposure and/or gain by way of block 726, the percentage of dark pixels drops below the second threshold percentage amount, process 700 ends in process block 734, where the parameter of the image sensor is set such that the mean intensity value is between the mid-target mean intensity value and the high target mean intensity value. Similarly, if while increasing the exposure and/or gain, the calculated mean intensity value reaches or exceeds the high target mean intensity value, then process 700 ends in process block 732, where the parameter of the image sensor is set such that the mean intensity value is approximately equal to the high target mean intensity value.

The processes described herein may be implemented by various means depending upon the application. For example, these processes may be implemented in hardware, firmware, software, or any combination thereof. For a hardware implementation, processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in image sensor 100 (FIG. 1) and executed by a processor. Memory may be implemented within or external to the image sensor.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method, comprising:
   capturing a series of digital images with an image sensor;
   as the series of digital images are captured, adjusting at least one parameter of the image sensor selected from a group consisting of exposure time and gain to adjust a mean intensity value of the digital images until a target mean intensity value is reached;
   selecting the target mean intensity value from a plurality of target mean intensity values based on a number of pixels, in each captured digital image, that have an intensity value that falls outside a range of intensity values;
   calculating mean intensity value of pixels included in each digital image as the digital images are captured;
   wherein calculating the mean intensity value of the pixels included in a digital image comprises:
   segmenting the digital image into a plurality of regions, wherein each of the plurality of regions has an associated region weight factor;
   weighting an intensity value of each pixel a first time with a region weight factor that is associated with a region where a respective pixel is located;
   weighting an intensity value of each pixel a second time with an intensity weight factor that is selected from a plurality of intensity weight factors based on an unweighted intensity value of a respective pixel;
   wherein the intensity weight factors are greater for pixels whose intensity values fall outside the range of intensity values than the intensity weight factors for pixels whose intensity values fall within the range of intensity values; and
   computing a summation of the weighted intensity values of the pixels.

2. The method of claim 1, wherein the mean intensity value is calculated as:

$$\Sigma(Wi*Mi*Yi)/\Sigma(Wi*Mi)$$

where $Wi$ Is the region weight factor of a respective pixel, $Mi$ is the intensity weight factor of a respective pixel, and $Yi$ is the intensity value of a respective pixel.

3. The method of claim 1, wherein selecting the target mean intensity value comprises, for each digital image as they are captured:
   determining a first percentage of pixels in a digital image that have an intensity value greater than an upper threshold of the range of intensity values; and
   setting the target mean intensity value to a first value selected from the plurality of target mean intensity values if the first percentage is greater that a first threshold percentage amount.

4. The method of claim 3, wherein selecting the target mean intensity value further comprises, for each digital image as they are captured:
   determining a second percentage of the pixels in the digital image that have an intensity value less than a lower threshold of the range of intensity values; and
   setting the target mean intensity value to a second value selected from the plurality of target mean intensity values if the second percentage is greater that a second threshold percentage amount.

5. The method of claim 4, wherein selecting the target mean intensity value further comprises, for each digital image as they are captured, setting the target mean intensity value to a third value selected from the plurality of target mean intensity values if the first percentage is less than the first threshold percentage amount and the second percentage is less than the second threshold percentage amount.

6. The method of claim 5, wherein the first value selected from the plurality of target mean intensity values is less than the second value and wherein the third value is between the first and second values.

7. The method of claim 1, wherein adjusting the at least one parameter of the image sensor comprises:
   (a) decreasing the at least one parameter while a first percentage of saturated pixels in each captured digital image exceeds a first threshold percentage amount until the mean intensity value is less than or equal to a low target mean intensity value;
   (b) if, while decreasing the at least one parameter in step (a), the first percentage of saturated pixels drops below the first threshold percentage amount, then adjusting the at least one parameter such that the mean intensity value is approximately equal to a mid-target mean intensity value;
   (c) if the first percentage of saturated pixels is greater than the first threshold percentage amount while the mean intensity value is at the mid-target mean intensity value, decreasing the at least one parameter until the first percentage of saturated pixels is less than the first threshold percentage amount, such that the mean intensity value is between the low target mean intensity value and the mid-target mean intensity value;
   (d) if the first percentage of saturated pixels is less than the first threshold percentage amount and a second percentage of dark pixels is greater than a second threshold percentage amount while the mean intensity value is at the mid-target mean intensity value, increasing the at least one parameter until the second percentage of dark pixels is less than the second threshold percentage amount, such that the mean intensity value is between the mid-target mean intensity value and a high target mean intensity value; and
   (e) if, while increasing the at least one parameter in step (d), the mean intensity value increases to greater than or equal to the high target mean intensity value, stopping the increasing of the at least one parameter.

8. The method of claim 1, wherein the intensity value of each pixel is a luminance Y value of the respective pixel.

9. The method of claim 1, wherein the intensity value of each pixel is the largest of a red (R) value, a green (G) value, and a blue (B) value of the respective pixel.

10. A non-transitory computer-readable medium including program code stored thereon, the program code comprising instructions to:
capture a series of digital images with an image sensor;
as the series of digital images are captured, adjust at least one parameter of the image sensor selected from a group consisting of exposure time and gain to adjust a mean intensity value of the digital images until a target mean intensity value is reached;
select the target mean intensity value from a plurality of target mean intensity values based on a number of pixels, in each captured digital image, that have an intensity value that falls outside a range of intensity values;
calculating mean intensity value of pixels included in each digital image as the digital images are captured, wherein calculating the mean intensity value includes:
segmenting each digital image into a plurality of regions, wherein each of the plurality of regions has an associated region weight factor;
weighting an intensity value of each pixel a first time with a region weight factor that is associated with a region where a respective pixel is located;
weighting an intensity value of each pixel a second time with an intensity weight factor that is selected from a plurality of intensity weight factors based on an unweighted intensity value of a respective pixel;
wherein the intensity weight factors are greater for pixels whose intensity values fall outside the range of intensity values than the intensity weight factors for pixels whose intensity values fall within the range of intensity values; and
computing a summation of the weighted intensity values of the pixels.

11. The non-transitory computer-readable medium of claim 10, wherein the instruction to select the target mean intensity value comprises instructions to, for each digital image as they are captured:
determine a first percentage of pixels in a digital image that have an intensity value greater than an upper threshold of the range of intensity values; and
set the target mean intensity value to a first value selected from the plurality of target mean intensity values if the first percentage is greater that a first threshold percentage amount.

12. The non-transitory computer-readable medium of claim 11, wherein the instructions to select the target mean intensity value further comprises instructions to, for each digital image as they are captured:
determine a second percentage of the pixels in the digital image that have an intensity value less than a lower threshold of the range of intensity values; and
set the target mean intensity value to a second value selected from the plurality of target mean intensity values if the second percentage is greater that a second threshold percentage amount.

13. The non-transitory computer-readable medium of claim 12, wherein the instructions to select the target mean intensity value further comprises instructions to, for each digital image as they are captured, set the target mean intensity value to a third value selected from the plurality of target mean intensity values if the first percentage is less than the first threshold percentage amount and the second percentage is less than the second threshold percentage amount.

14. The non-transitory computer-readable medium of claim 13, wherein the first value selected from the plurality of target mean intensity values is less than the second value and wherein the third value is between the first and second values.

15. An image sensor, comprising:
a plurality of pixels;
a readout circuit coupled to the plurality of pixels for capturing a series of digital images; and
a parameter adjustor coupled to the readout circuit for:
as the series of digital images are captured, adjusting at least one parameter of the image sensor selected from a group consisting of exposure time and gain to adjust a mean intensity value of the digital images until a target mean intensity value is reached;
selecting the target mean intensity value from a plurality of target mean intensity values based on a number of pixels, in each captured digital image, that have an intensity value that falls outside a range of intensity values;
wherein the parameter adjustor comprises a mean intensity calculator for calculating a mean intensity value of pixels included in each digital image as the digital images are captured, wherein calculating the mean intensity value includes:
segmenting each digital image into a plurality of regions, wherein each of the plurality of regions has an associated region weight factor;
weighting an intensity value of each pixel a first time with a region weight factor that is associated with a region where a respective pixel is located;
weighting an intensity value of each pixel a second time with an intensity weight factor that is selected from a plurality of intensity weight factors based on an unweighted intensity value of a respective pixel;
wherein the intensity weight factors are greater for pixels whose intensity values fall outside the range of intensity values than the intensity weight factors for pixels whose intensity values fall within the range of intensity values; and
computing a summation of the weighted intensity values of the pixels.

16. The image sensor of claim 15, wherein selecting the target mean intensity value from a plurality of target mean intensity values includes:
determining a first percentage of pixels in a digital image that have an intensity value greater than an upper threshold of the range of intensity values; and
setting the target mean intensity value to a first value selected from the plurality of target mean intensity values if the first percentage is greater that a first threshold percentage amount.

17. The image sensor of claim 16, wherein selecting the target mean intensity value from a plurality of target mean intensity values further includes:
determining a second percentage of the pixels in the digital image that have an intensity value less than a lower threshold of the range of intensity values; and
setting the target mean intensity value to a second value selected from the plurality of target mean intensity values if the second percentage is greater that a second threshold percentage amount.

18. The image sensor of claim 17, wherein selecting the target mean intensity value from a plurality of target mean intensity values further includes setting the target mean intensity value to a third value selected from the plurality of target mean intensity values if the first percentage is less than the first threshold percentage amount and the second percentage is less than the second threshold percentage amount.

19. The image sensor of claim 18, wherein the first value selected from the plurality of target mean intensity values is less than the second value and wherein the third value is between the first and second values.

* * * * *